US012675211B2

(12) United States Patent
Kim

(10) Patent No.: US 12,675,211 B2
(45) Date of Patent: Jul. 7, 2026

(54) USER INTERFACE FOR IMAGES WITH WIDE FIELD OF VIEW

(71) Applicant: Hanwha Vision Co., Ltd., Seongnam-si (KR)

(72) Inventor: Yeon Woo Kim, Seongnam-si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 278 days.

(21) Appl. No.: 18/648,017

(22) Filed: Apr. 26, 2024

(65) Prior Publication Data

US 2024/0361893 A1     Oct. 31, 2024

(30) Foreign Application Priority Data

Apr. 28, 2023     (KR) ........................ 10-2023-0056596

(51) Int. Cl.
   *G06F 3/04845*     (2022.01)
   *H05B 47/175*     (2020.01)
(52) U.S. Cl.
   CPC ....... *G06F 3/04845* (2013.01); *H05B 47/196* (2024.01); *G06F 2203/04806* (2013.01)
(58) Field of Classification Search
   CPC ................................................. G06F 3/04845
   USPC ........................................................ 715/788
   See application file for complete search history.

(56) References Cited

U.S. PATENT DOCUMENTS

| | | | | |
|---|---|---|---|---|
| 5,796,426 A * | 8/1998 | Gullichsen | .............. | G06T 3/047 |
| | | | | 382/293 |
| 6,687,387 B1 * | 2/2004 | Molnar | ..................... | G06T 5/80 |
| | | | | 348/154 |
| 9,547,883 B1 * | 1/2017 | Stepanenko | .............. | G06T 3/12 |
| 9,609,197 B1 * | 3/2017 | Stepanenko | ........... | H04N 23/81 |
| 12,430,867 B2 * | 9/2025 | Kim | ....................... | G06V 20/58 |
| 2010/0014770 A1 * | 1/2010 | Huggett | .................... | G06T 3/00 |
| | | | | 382/254 |
| 2010/0303383 A1 * | 12/2010 | Huggett | .................... | G06T 3/00 |
| | | | | 382/300 |
| 2011/0141321 A1 * | 6/2011 | Tang | .................... | H04N 25/611 |
| | | | | 348/240.99 |
| 2012/0275725 A1 * | 11/2012 | Kelly | ...................... | G06T 3/047 |
| | | | | 382/293 |

(Continued)

FOREIGN PATENT DOCUMENTS

| | | |
|---|---|---|
| KR | 10-1372171 B1 | 3/2014 |
| KR | 10-1655839 B1 | 9/2016 |

(Continued)

*Primary Examiner* — Reza Nabi
(74) *Attorney, Agent, or Firm* — Sughrue Mion, PLLC

(57) ABSTRACT

An operating method for a server includes: displaying, on a screen of a user terminal, a first user interface including a first image obtained by correcting a captured image; displaying, on the screen of the user terminal, a second user interface including a first control point, a second control point, and a segment connecting the first control point to the second control point; obtaining a first user input from the first control point or the second control point; and in response to the first user input, displaying, through the first user interface, a second image obtained by correcting the captured image based on rotational information determined by the first control point, the second control point and the segment, and a center position of the first image.

17 Claims, 11 Drawing Sheets

(56) References Cited

U.S. PATENT DOCUMENTS

| | | | | |
|---|---|---|---|---|
| 2014/0184646 | A1* | 7/2014 | Liu | G06T 11/00 |
| | | | | 345/634 |
| 2017/0287107 | A1* | 10/2017 | Forutanpour | G06T 3/047 |
| 2017/0287200 | A1* | 10/2017 | Forutanpour | G06T 3/12 |
| 2018/0357804 | A1* | 12/2018 | Forutanpour | G06T 11/60 |
| 2019/0116305 | A1* | 4/2019 | Lee | H04N 23/69 |
| 2019/0156145 | A1* | 5/2019 | Pourian | G06F 18/22 |
| 2020/0126179 | A1* | 4/2020 | Yan | G05D 1/249 |
| 2022/0053130 | A1* | 2/2022 | Liu | H04N 23/69 |
| 2022/0198814 | A1* | 6/2022 | Tandel | G06V 30/1478 |
| 2022/0217315 | A1* | 7/2022 | Aggarwal | G06T 5/80 |
| 2023/0196523 | A1* | 6/2023 | Chen | G06T 5/80 |
| | | | | 382/275 |
| 2023/0401669 | A1* | 12/2023 | He | G06T 3/047 |
| 2024/0331202 | A1* | 10/2024 | Wang | G06T 3/40 |
| 2024/0361893 | A1* | 10/2024 | Kim | G06F 3/04847 |
| 2025/0111530 | A1* | 4/2025 | Liu | G06F 17/11 |
| 2025/0117877 | A1* | 4/2025 | Liu | G06T 3/047 |
| 2025/0124592 | A1* | 4/2025 | Park | G08G 1/168 |
| 2025/0272941 | A1* | 8/2025 | Kim | G06V 20/40 |

FOREIGN PATENT DOCUMENTS

| | | | |
|---|---|---|---|
| KR | 10-1895374 | B1 | 11/2018 |
| KR | 10-2395644 | B1 | 5/2022 |

* cited by examiner

USER INTERFACE FOR IMAGES WITH WIDE FIELD OF VIEW

CROSS-REFERENCE TO RELATED APPLICATION

This application is based on and claims priority to Korean Patent Application No. 10-2023-0056596, filed on Apr. 28, 2023, in the Korean Intellectual Property Office, the disclosure of which is incorporated by reference herein in its entirety.

BACKGROUND

1. Field

This disclosure relates to a user interface for displaying images with a wide field of view.

2. Description of Related Art

Images captured by an image capturing device may be modified to be effectively displayed to users. For example, a fisheye camera may capture images with a wide field of view using a wide-angle lens and convert the images into flat images to provide the same to users.

The above-mentioned background art is technical information that the inventor possessed for deriving the disclosure or the inventor acquired in the process of deriving the disclosure. The background art is may not be known art disclosed to the public before filing the application for the present disclosure.

SUMMARY

Provided is an interface for displaying an image with a wide FOV.

Further provided is an interface for managing a parking surface.

Additional aspects will be set forth in part in the description which follows and, in part, will be apparent from the description, or may be learned by practice of the presented embodiments of the disclosure.

According to an aspect of the disclosure, an operating method for a server may include: displaying, on a screen of a user terminal, a first user interface including a first image obtained by correcting a captured image; displaying, on the screen of the user terminal, a second user interface including a first control point, a second control point, and a segment connecting the first control point to the second control point; obtaining a first user input from the first control point or the second control point; and in response to the first user input, displaying, through the first user interface, a second image obtained by correcting the captured image based on rotational information determined by the first control point, the second control point and the segment, and a center position of the first image.

The obtaining the first user input includes moving one of the first control point or the second control point in a clockwise or counterclockwise direction about a center point between the first control point and the second control point, where the other of the first control point or the second control point moves in the clockwise or counterclockwise direction about the center point between the first control point and the second control point.

The obtaining the first user input may include selecting the first control point or the second control point and dragging the selected first control point or the second control point to a position on the screen of the user terminal.

The first user input may determine a zoom of the second image based on a distance between the first control point and the second control point.

The rotational information may determine a roll, a pitch, and a yaw of the second image based on an angle formed by the first control point, the second control point, and the segment.

The method may further include obtaining, through a third user interface provided to the user terminal, a second user input corresponding to a parking surface setting in the second image displayed on the screen.

The method may further include obtaining, through a fourth user interface provided to the user terminal, a third user input based on a use of the parking surface based on the parking surface setting.

The method may further include obtaining, through a fifth user interface provided to the user terminal, a fourth user input for controlling a lighting of the parking surface based on the parking surface setting.

The obtaining the first user input may include selecting the first control point or the second control point and dragging the selected first control point or the second control point to a position on the screen of the user terminal, where the first user input determines the rotational information, and where the rotational information determines a roll, a pitch, and a yaw of the first image based on an angle formed by the first control point, the second control point, and the segment.

The obtaining the second user input corresponding to the parking surface setting may include obtaining, through the third user interface, one or more polygon shapes respectively defining one or more parking surfaces.

The captured image may include a plurality of images or a video.

According to an aspect of the disclosure, a server may include a memory including instructions for a user terminal; and a processor configured to execute the instructions to perform operations including: displaying, on a screen of the user terminal, a first user interface including a first image obtained by correcting a captured image; displaying, on the screen of the user terminal, a second user interface including a first control point, a second control point, and a segment connecting the first control point to the second control point; obtaining a first user input from the first control point or the second control point; and in response to the first user input, displaying, through the first user interface, a second image obtained by correcting the captured image based on rotational information determined by the first control point, the second control point and the segment, and a center position of the first image.

The obtaining the first user input may include moving one of the first control point or the second control point in a clockwise or counterclockwise direction about a center point between the first control point and the second control point, where the other of the first control point or the second control point moves in the clockwise or counterclockwise direction about the center point between the first control point and the second control point.

The rotational information may determine a roll, a pitch, and a yaw of the second image based on an angle formed by the first control point, the second control point, and the segment.

The processor may be further configured to execute the instructions to perform an operation of obtaining, through a third user interface provided to the user terminal, a second user input corresponding to a parking surface setting in the second image displayed on the screen.

The processor may be further configured to execute the instructions to perform an operation of obtaining, through a fourth user interface provided to the user terminal, a third user input based on a use of the parking surface based on the parking surface setting.

The processor may be further configured to execute the instructions to perform an operation of obtaining, through a fifth user interface provided to the user terminal, a fourth user input for controlling a lighting of the parking surface based on the parking surface setting.

The third user interface may overlay the first user interface, where the second user input corresponding to a parking surface setting includes an input of one or more polygon shapes, and where the one or more polygon shapes respectively defining one or more parking surfaces.

The processor may be further configured to execute the instructions to perform an operation of displaying, through a sixth user interface provided to the user terminal, the captured image in an uncorrected state.

According to an aspect of an embodiment, a computer-readable recording medium on which a computer program is recorded, wherein the computer-readable recording medium includes instructions to cause a processor to: display a first user interface on a screen of a user terminal including a first image obtained by correcting a captured image; display a second user interface on the screen of the user terminal including a first control point, a second control point, and a segment connecting the first control point to the second control point; obtain a first user input from the first control point or the second control point; and based on the first user input, display a second image obtained by correcting the captured image based on rotational information determined by the first control point, the second control point, and the segment, and a center position of the first image.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1:
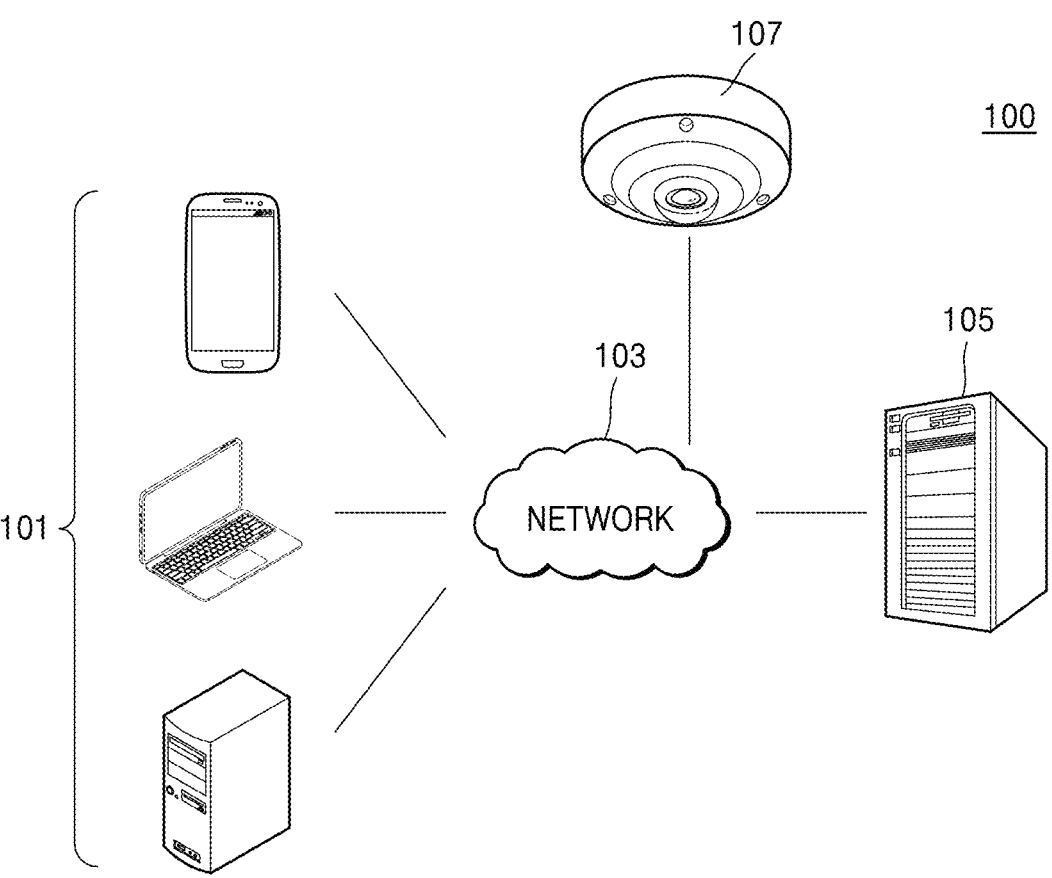
FIG. 1 is a diagram of an interface providing system, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "of" includes any and all combinations of one or more of the associated listed items. The phrase "at least one of," "one or more of" or the like, when used with a list of items with either "and" or "or," means that any combination of one or more of the listed items may be used.

Terms used in the disclosure are merely used to describe specific embodiments and may not be intended to limit the scope of other embodiments. Singular expressions may include plural expressions unless the context clearly indicates otherwise. Terms used herein, including technical or scientific terms, may have the same meaning as generally understood by those skilled in the art described in the disclosure. Among the terms used in the disclosure, terms defined in general dictionaries may be interpreted to have the same or similar meaning as the meaning they have in the context of related technology and may not be interpreted in an ideal or excessively formal sense unless clearly defined in the disclosure.

Below, with reference to the attached drawings, one or more embodiments are described in detail. In describing the embodiments disclosed herein, when it is determined that detailed description of related known technologies may obscure the gist of the inventive concept, the detailed description of the known technologies may be omitted. Identical or similar components may be assigned the same reference number and duplicate descriptions thereof may be omitted.

The term "unit" used herein refers to a component that performs a specific function performed by software or hardware, such as field programmable gate array (FPGA) or application specific integrated circuit (ASIC). However, the term "unit" is not limited to being performed by software or hardware. The term "unit" may exist in the form of data stored in an addressable storage medium or may be implemented by instructions so that one or more processors are configured to execute a specific function.

The software may include computer programs, code, instructions, or a combination of one or more thereof and may configure processing devices to operate as desired or may instruct the processing devices independently or collectively. The software and/or data may be embodied permanently or temporarily in any type of machine, component, physical device, virtual equipment, computer storage medium or device, or transmitted signal wave to be interpreted by or to provide instructions or data to the processing devices. The software may be distributed over networked computer systems and may be stored or executed in a distributed manner. The software and data may be stored on one or more computer-readable recording media. The software may be read into main memory from another computer-readable medium, such as a data storage device, or from another device via a communication interface. Software instructions stored in the main memory may cause the processor to perform processes or operations described in detail below. Alternatively, hardwired circuitry may be used instead of or in combination with the software instructions to execute processes consistent with the principles of the disclosure. Accordingly, embodiments consistent with the principles of the disclosure are not limited to any particular combination of hardware circuitry and software.

The terms herein, such as "comprise" or "include", are intended to designate the presence of features, numbers, steps, operations, components, parts, or combinations thereof described herein, but do not preclude the presence or addition of one or more other features, numbers, steps, operations, components, parts, or combinations thereof. Terms, such as first, second, etc., may be used to distinguish various components, but should not be construed as limiting.

In this disclosure, the term "user input" is defined to include any form of data or signal input that is received. This may include inputs originating from a human user, such as a keystroke, voice command, or gestural input, as well as inputs from machines, sensors, or other devices capable of generating data.

FIG. 1 is a diagram of an interface providing system 100, according to an embodiment. The interface providing system 100 may be a system in which an image is transmitted from a server 105 to a user terminal 101 through a network 103, and the user terminal 101 may display the image on a display. The image transmitted through the interface providing system 100 may be a live image transmitted from an image capturing device 107 to the server 105.

Referring to FIG. 1, the interface providing system 100 may include the network 103, the server 105, the user terminal 101, and the image capturing device 107. FIG. 1 is an example for explaining the disclosure, and the number of devices connected to the network 103 in the interface providing system 100 according to an embodiment is not limited thereto.

The network 103 is a network that connects a plurality of devices for wired or wireless communication. According to an embodiment, the network 103 may include wired networks, such as local area networks (LAN), wide area networks (WAN), metropolitan area networks (MAN), and integrated service digital networks (ISDN), and wireless networks, such as wireless LAN, code-division multiple access (CDMA), Bluetooth, and satellite communication. The network 103 may be a closed network with no contact points or nodes connected to an external network. In other words, the network 103 may be a communication line that connects only predetermined components. According to an embodiment, the network 103 may include a communication line that connects the server 105, the user terminal 101, and the image capturing device 107.

The server 105 may be implemented as a computer device or a plurality of computer devices that communicate with the user terminal 101 over a network to provide instructions, code, files, content, and services. According to an embodiment, the server 105 may create a user interface. Additionally, the server 105 may provide content to the user terminal 101. The user terminal 101 may connect to the server 105 under the control by at least one program and may receive services or content provided by the server 105. This server 105 is described in detail with reference to FIG. 2. The server 105 according to an embodiment may perform operations according to instructions and may provide a user interface to the user terminal 101.

The user terminal 101 refers to an electronic device that obtains information through the network 103 and provides the obtained information to the user. The user terminal 101 may include a fixed user terminal or a mobile user terminal, implemented as a computer device. According to an embodiment, the user terminal 101 may include a smartphone, a mobile phone, a navigation device, a computer, a laptop, a user terminal for digital broadcasting, personal digital assistants (PDA), a portable multimedia player (PMP), and a tablet PC. The user terminal 101 may communicate with the server 105 through the network 103 using a wireless or wired communication method. The user terminal 101 may receive programs or instructions from the server 105 and perform operations according to the instructions.

According to an embodiment, the user terminal 101 may receive model information and installation information from the user through user inputs, such as touch, tap, drag, and click. The user terminal 101 may perform a function of displaying a user interface (UI) screen for simulation through a display. The user interface may refer to an interaction point between a user and a software application, a website, or a digital product, including the visual layout, design, and elements that enable the user to navigate, input data, and perform various tasks within a system. The elements of the user interface may refer to building blocks of a graphical user interface (GUI) that enable a user to interact with a software application, a website, or a digital product. The elements of the user interface may provide visual and interactive means for a user to input data, navigate, and perform various tasks within an application or a website.

The user terminal 101 may be provided with a user interface or receive service information from the server 105 through the network 103. The user terminal 101 may display a user interface including content on the screen through at least one display. The user terminal 101 may obtain user inputs and change the user interface and the screen in response to the user inputs.

The screen may include information about the structure and arrangement of graphic objects as well as information about items and content included in the user interface. In addition, screen configuration information may be produced with instructions or web scripts produced in various web languages, such as hypertext markup language (HTML), cascading style sheets (CSS), JavaScript, extensible markup language (XML), and the like. That is, the user terminal 101 may receive a user interface and content, and render the same, based on web languages, such as hypertext markup language (HTML), cascading style sheets (CSS), JavaScript, extensible markup language (XML), and the like, to display on the screen.

The image capturing device 107 refers to a device that acquires an image by capturing a preset area. The image capturing device 107 may transmit the captured image to the server 105 or to the user terminal 101. The image capturing device 107 may refer to a device equipped with a wide-angle lens that can acquire an image with a wide field of view (FOV) of up to 180 degrees or more in a single frame, such as a fisheye camera. Alternatively, the image capturing device 107 may include a pan, tilt, zoom (PTZ) camera or a pan, tilt, rotation, zoom (PTRZ) camera, wherein a PTZ value may be a value including one or more of the pan value, the tilt value, and the zoom value. The image captured by the image capturing device 107 may include a still images, video data, or both still images and video data.

According to an embodiment, the image capturing device 107 may be a device used for managing a parking space. The shape and type of the image capturing device 107 shown in FIG. 1 are only an example and are not limited thereto. Any device that acquires an image and transmits the acquired image through a connected network may correspond to the image capturing device 107.

The interface providing system 100 according to an embodiment may display an image obtained by dewarping (e.g., correcting) a captured image on a screen of the user terminal 101. This dewarping may include a process of correcting a distorted image with a wide angle of view. The distorted image may be corrected into a flat image using inherent parameters and external parameters of an image capturing device, and a dewarping algorithm.

The inherent parameters of the image capturing device may include a focal length, an optical center, and a distortion coefficient. The external parameters of the image capturing device may include a rotation matrix (R) and a translation vector (T) for the position of the image to be obtained in 3D space based on the reference coordinate system. The rotation matrix may refer to a 3×3 matrix as roll, pitch, and yaw. The translation vector may refer to a 3×1 vector indicating the optical center position from the reference coordinate system to the image capturing device.

According to an embodiment, in the interface providing system 100, dewarping may be performed in at least one of the image capturing device 107, the user terminal 101, and the server 105 to correct the distorted image into a flat image and display the flat image on the screen of the user terminal 101.

Figure 2:
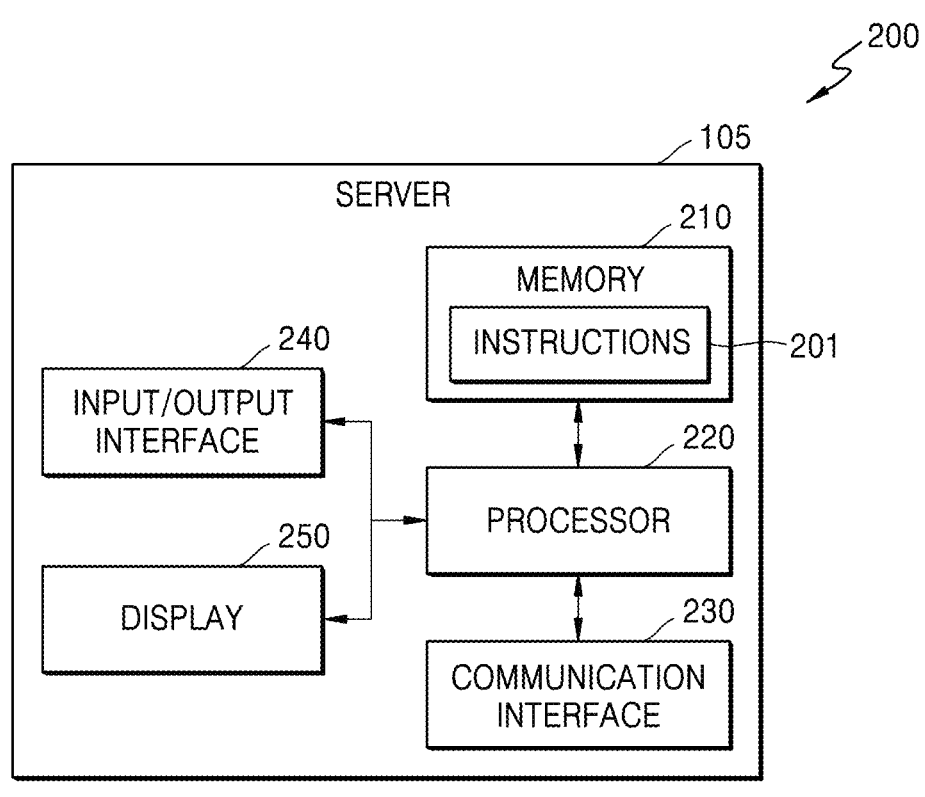
FIG. 2 is a diagram of a configuration of a server, according to an embodiment.

FIG. 2 is a diagram of a configuration of a server, according to an embodiment.

FIG. 2 shows a configuration 200 of a server 105 in the interface providing system 100, according to some embodiments. The term herein, such as "unit" or "portion", may refer to a unit for performing at least one function or operation, which may be implemented by hardware, software, or a combination of hardware and software. The server 105 may include a memory 210, a processor 220, a communication interface 230, an input/output interface 240, and a display 250. The server 105 may execute one or more sets of instructions 201 to perform any one or more of the methodologies described herein.

The memory 210 may store a set of instructions 201, including instructions associated with a user interface and instructions associated with a system to perform any one or more functions of the methodologies described herein. The memory 210 may temporarily or permanently store data, such as basic programs, applications, and setting information for the operation of the server 105. The memory 210 may include a permanent mass storage device, such as random-access memory (RAM), read-only memory (ROM), and a disk drive, but is not limited thereto. These software components may be loaded from a computer-readable recording medium separate from the memory 210 using a drive mechanism. The separate computer-readable recording medium may include, e.g., a floppy drive, a disk, a tape, a DVD/CD-ROM drive, and a memory card. In one or more embodiments, the software components may be loaded into the memory 210 through the communication interface 230 rather than the computer-readable recording medium. Additionally, the memory 210 may provide stored data upon request from the processor 220.

The processor 220 may control the overall operations of the server 105. For example, the processor 220 may control signals to be transmitted and received through the communication interface 230. Additionally, the processor 220 may be configured to process instructions of a computer program by performing basic arithmetic, logic, and input/output operations. The instructions may be provided to the processor 220 by the memory 210 or the communication interface 230. For example, the processor 220 may be configured to execute the received instructions according to program code stored in a recording device, such as the memory 210. For example, the processor 220 may control the server 105 to perform operations according to various embodiments described below.

According to an embodiment, the processor 220 may execute one or more sets of instructions 201 to provide a user interface for displaying images on the screen of the user terminal 101 and obtaining user inputs. The user interface is described below with reference to FIGS. 3 to 8.

The communication interface may include any one or any combination of a digital modem, a radio frequency (RF) modem, an antenna circuit, a WiFi chip, and related software and/or firmware. The communication interface 230 may perform functions for transmitting and receiving signals through a wired or wireless channel. All or part of the communication interface 230 may be referred to as a transmitter, a receiver, or a transceiver. The communication interface 230 may provide a function for the server 105 and at least one other node to communicate with each other through a communication network. According to an embodiment, when the processor 220 of the server 105 generates a request signal according to the program code stored in the recording device, such as the memory 210, the request signal may be transmitted to at least one other node through a communication network under the control by the communication interface 230. Conversely, control signals, instructions, content, files, etc., provided under the control by a processor of at least one other node, may be received by the server 105 through the communication interface 230.

The input/output interface 240 may provide an interface with an input/output device. The input device may be provided in the form of a device, such as a keyboard or a mouse, and the output device may be provided in the form of a device, such as a display for displaying images. As another example, the input/output interface 240 may provide an interface with a device that integrates input and output functions into one, such as a touch screen. In processing instructions of the computer program loaded into the memory 210, the processor 220 of the server 105 may display a service screen or content configured by using data provided by the server 105 on the display through the input/output interface 240. According to an embodiment, the input/output interface 240 may provide an interface for the display 250. The input/output interface 240 may receive a user input for a web browsing window displayed on the display 250 and may receive output data to be output through the display 250 from the processor 220, in response to the above-described user input.

The display 250 refers to a display module including one or more displays. Each of the one or more displays included in the display 250 may individually display independent content and the one or more displays described above may be combined to display a single content. According to an embodiment, the one or more displays included in the display 250 may include physically separated multiple displays, may be physically coupled multiple displays, or may be displays that can be used by dividing one screen.

Figure 3:
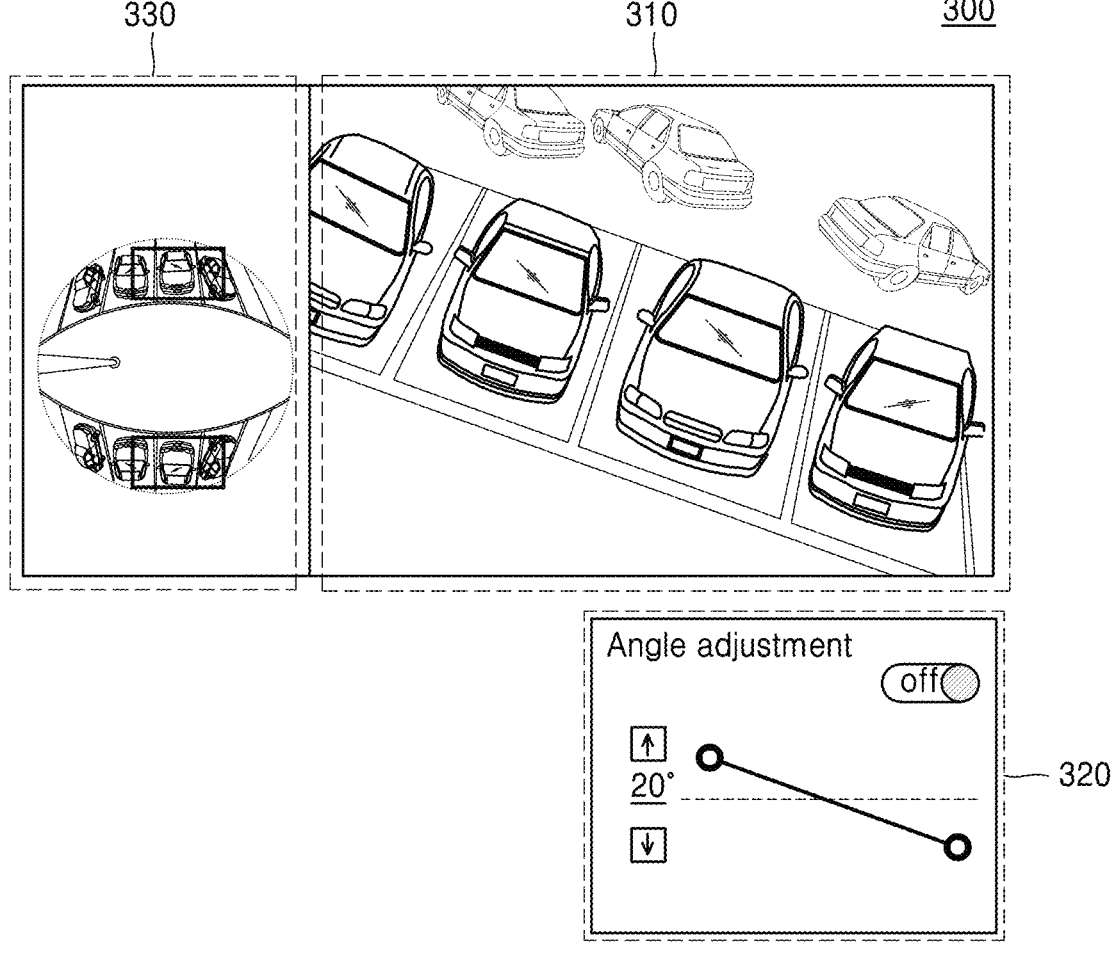
FIG. 3 is a diagram of a screen on which a first image is displayed, according to an embodiment.

FIG. 3 is a diagram of a screen 300 on which a first image is displayed, according to an embodiment.

Referring to FIG. 3, the screen 300 on which the first image is displayed according to an embodiment may include a first user interface 310, a second user interface 320, and a captured image interface 330.

The first user interface 310 may display an image obtained by dewarping the image captured by the image capturing device 107 on the screen 300. The first user interface 310 may display on the screen 300 an image obtained by dewarping the captured image according to the external parameters of the image capturing device that change according to user inputs. That is, the first user interface 310 may display one or more dewarped images on the screen 300. The dewarped images displayed on the first user interface 310 may dynamically change according to the user inputs. That is, the orientation or zoom of the dewarped images displayed on the first user interface 310 may change based on the first user input.

The second user interface 320 which is a user interface for determining rotational information may display interface elements on the screen 300, may obtain one or more user inputs. The second user interface 320 may include a first control point, a second control point, and a segment connecting the first control point to the second control point. Hereinafter, the process of determining the rotational information based on the elements of the second user interface and the user inputs is described in detail with reference to FIGS. 4A to 4C.

The captured image interface 330 (e.g., a sixth user interface) may display the captured image on the screen 300. The captured image may be an image with a wide FOV of up to 180 degrees or more in a single frame.

The server 105 may provide the first user interface 310, the second user interface 320, and the captured image interface 330 to the user terminal 101.

Figure 4A:
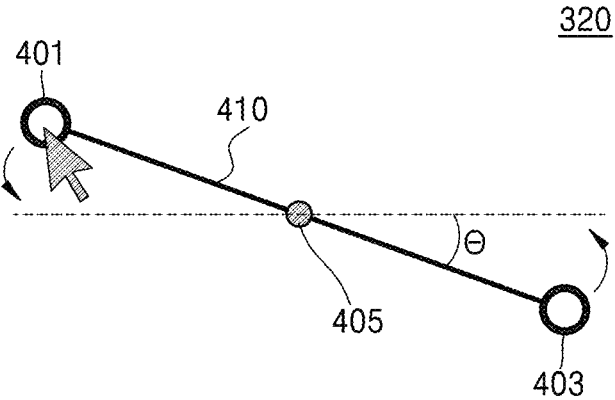
FIGS. 4A, 4B, and 4C are examples of a user interface for determining rotational information, according to an embodiment.
Figure 4B:
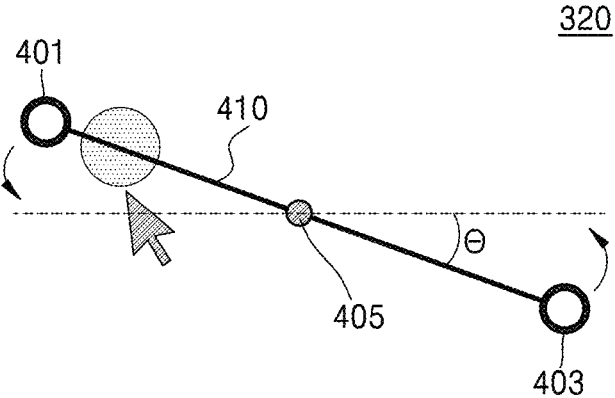
Figure 4C:
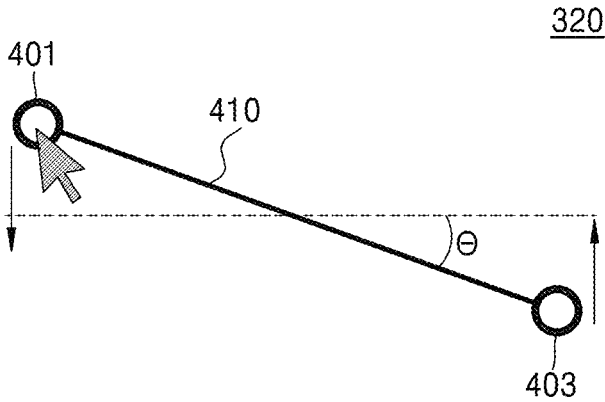

FIGS. 4A, 4B, and 4C are examples of a user interface for determining rotational information, according to an embodiment. The second user interface 320 may include a first control point 401, a second control point 403, and a segment 410 connecting the first control point to the second control point. An arrangement of the first control point 401, the second control point 403, and the segment 410 may determine the rotational information or zoom of the dewarped image. Therefore, the first control point 401, the second control point 403, and the segment 410 may determine the orientation of the dewarped image.

Referring to FIG. 4A, the user may move control points clockwise or counterclockwise using user inputs. The second user interface 320 may obtain a user input to control the first control point 401 or the second control point 403 clockwise or counterclockwise. The first control point 401 and the second control point 403 may move in the same direction with respect to a center point 405 between the first control point 401 and the second control point 403. That is, when the first control point 401 moves counterclockwise based on the center point 405 due to the user input, the second control point 403 may also move counterclockwise based on the center point 405. That is, a movement of one of the first control point or the second control point may correspond with a movement of the other of the first control point or the second control point.

Referring to FIG. 4B, the user may move one end or the other end of the segment 410 clockwise or counterclockwise using the user input. The second user interface 320 may obtain the user input to control one end or the other end of the segment 410 clockwise or counterclockwise. This segment 410 may move clockwise or counterclockwise based on the center point 405 between the first control point 401 and the second control point 403.

Referring to FIG. 4C, the user may move the control points in the up and down direction using the user input. The second user interface 320 may obtain the user input that controls the first control point 401 or the second control point 403 in the up and down direction. The first control point 401 and the second control point 403 may move in the opposite direction with respect to the center point 405 between the first control point 401 and the second control point 403. That is, when the first control point 401 moves downward based on the center point 405 due to the user input, the second control point 403 may also move upward based on the center point 405.

According to an embodiment, the interface in FIGS. 4A, 4B, and 4C may select the first control point 401 or the second control point 403, and may determine the amount of change in the rotation angle by receiving an input of dragging the activated first control point 401 or second control point 403 to a user-specified location on the screen of the user terminal.

According to an embodiment, the interface in FIGS. 4A, 4B, and 4C may control the zoom in or zoom out of the dewarped image by adjusting the distance between the first control point 401 and the second control point 403.

The second user interface 320 may determine roll, pitch, and yaw based on the rotation angle formed by the first control point 401, the second control point 403, and the segment 410. For example, the second user interface 320 may determine the three-dimensional rotation matrix for generating the second image by using the amount of change in the rotation angle according to the user input.

For example, the second user interface 320 may determine the three-dimensional rotation matrix for generating the second image by using the amount of change in the rotation angle in the three-dimensional rotation matrix, which is an external parameter of the image capturing device for generating the first image displayed on the first interface 310.

At least one of the user terminal 101, the server 105, and the image capture device 107 may generate a planar image of the captured image by using a dewarping algorithm, with the center position for generating the first image as a translation vector and a rotation matrix for generating the second image.

According to an embodiment, the rotation matrix for generating the second image may be determined by using the amount of change in the rotation angle in the lens distortion parameter, which is an external parameter of the image capturing device for generating the first image displayed on the first interface 310. A server may perform dewarping by using a correction function that converts the coordinates $(x_d, y_d)$ distorted by the fisheye camera into undistorted coordinates $(x_u, y_u)$ to generate the first image obtained by dewarping the captured image. An angle of the dewarped image may be adjusted through the first interface 310 and a matrix for rotating the dewarped image may be determined using the amount of change $\theta$ in the rotation angle. The server may convert the amount of change $\theta$ from the dewarped image to the leveled image into the coordinate system of the fisheye camera image, may determine the area to apply new dewarping according to the rotation angle in the original fisheye image, and may create a flat image of the captured image by using the dewarping algorithm again for the corresponding area. Also, the dewarped image may refer to the first image or the second image.

Figure 5:
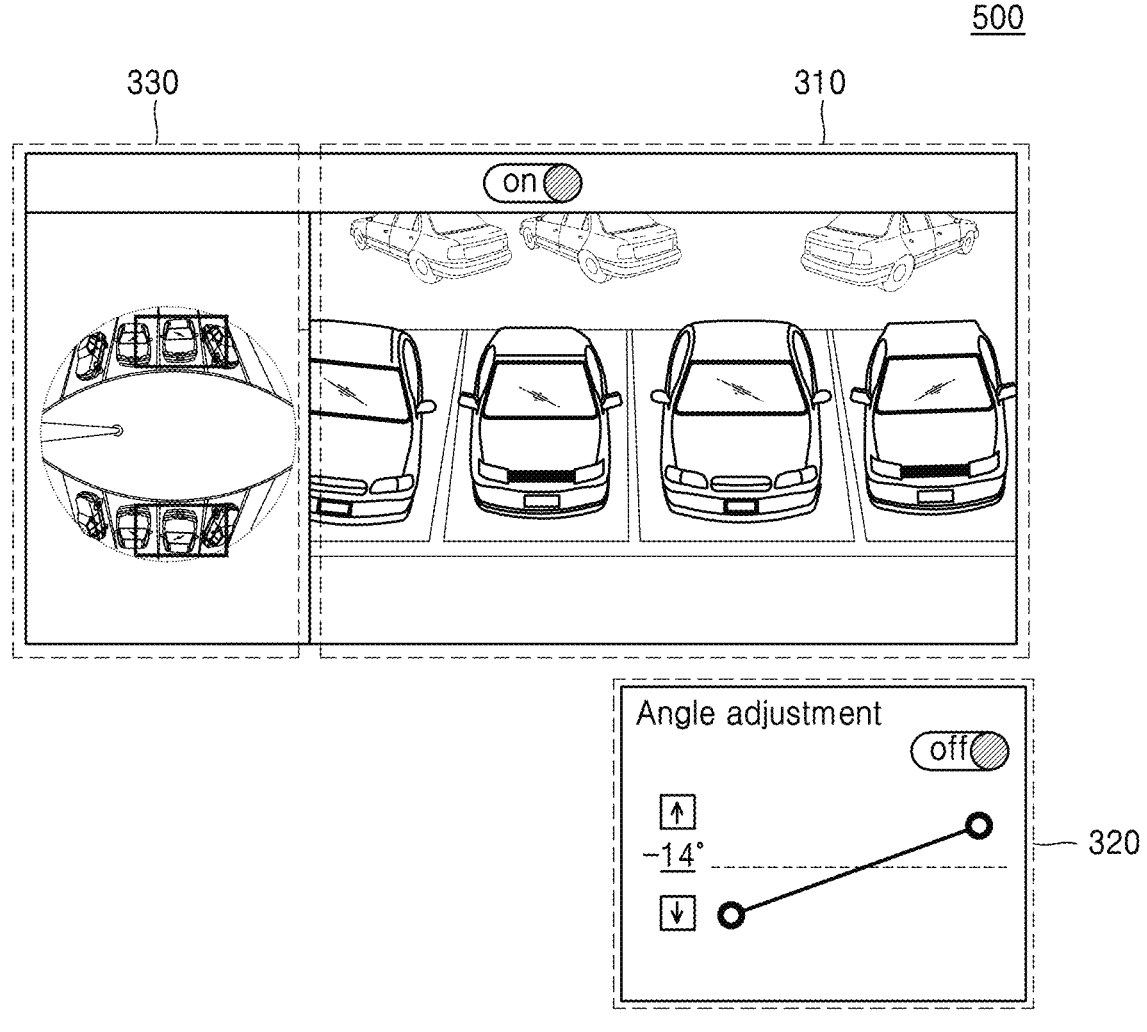
FIG. 5 is a diagram of a screen on which a second image is displayed, according to an embodiment.

FIG. 5 is a diagram of a screen 500 on which a second image is displayed, according to an embodiment.

As described above, the second user interface 320 which is a user interface for determining rotational information may determine the rotational information by obtaining user inputs. The first user interface 310 may display on the screen 500 a second image obtained by dewarping the captured image according to various external parameters of the image capturing device. That is, the first user interface 310 may display images on the screen 500. The images displayed on the screen 500 by the first user interface 310 may be dynamically changing according to user inputs. For instance, the user inputs may control the images displayed on the screen 500.

Figure 6:
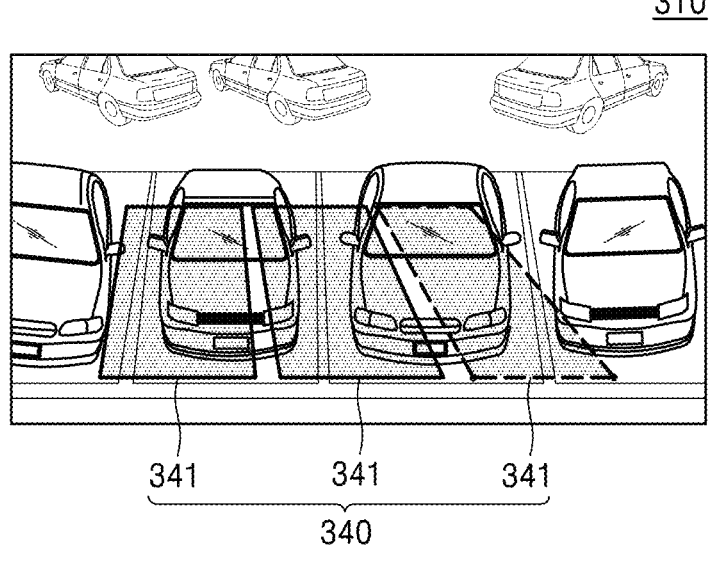
FIG. 6 is an example of a user interface for setting a parking surface, according to an embodiment.

FIG. 6 is an example of a user interface for setting a parking surface, according to an embodiment.

Referring to FIG. 6, the captured image captured by the image capturing device 107 may include an image of a parking space. The user may define one or more parking surface 341 using a third user interface 340 on the dewarped image.

The third user interface 340 may obtain a user input corresponding to the parking surface setting from the dewarped image displayed on the screen.

The third user interface 340 may be overlaid on the first user interface 310. The third user interface 340 may obtain user inputs to form a polygon shape at the position of the dewarped image displayed on the screen. For instance, a user may draw the polygon shape. The third user interface 340 may define the one or more parking surface 341 in response to the user inputting one or more polygon shapes. For example, one polygon obtained by the third user interface 340 may define one parking surface 341.

The third user interface 340 may modify, resize, or rearrange the polygon shape obtained by the user input.

Figure 7:
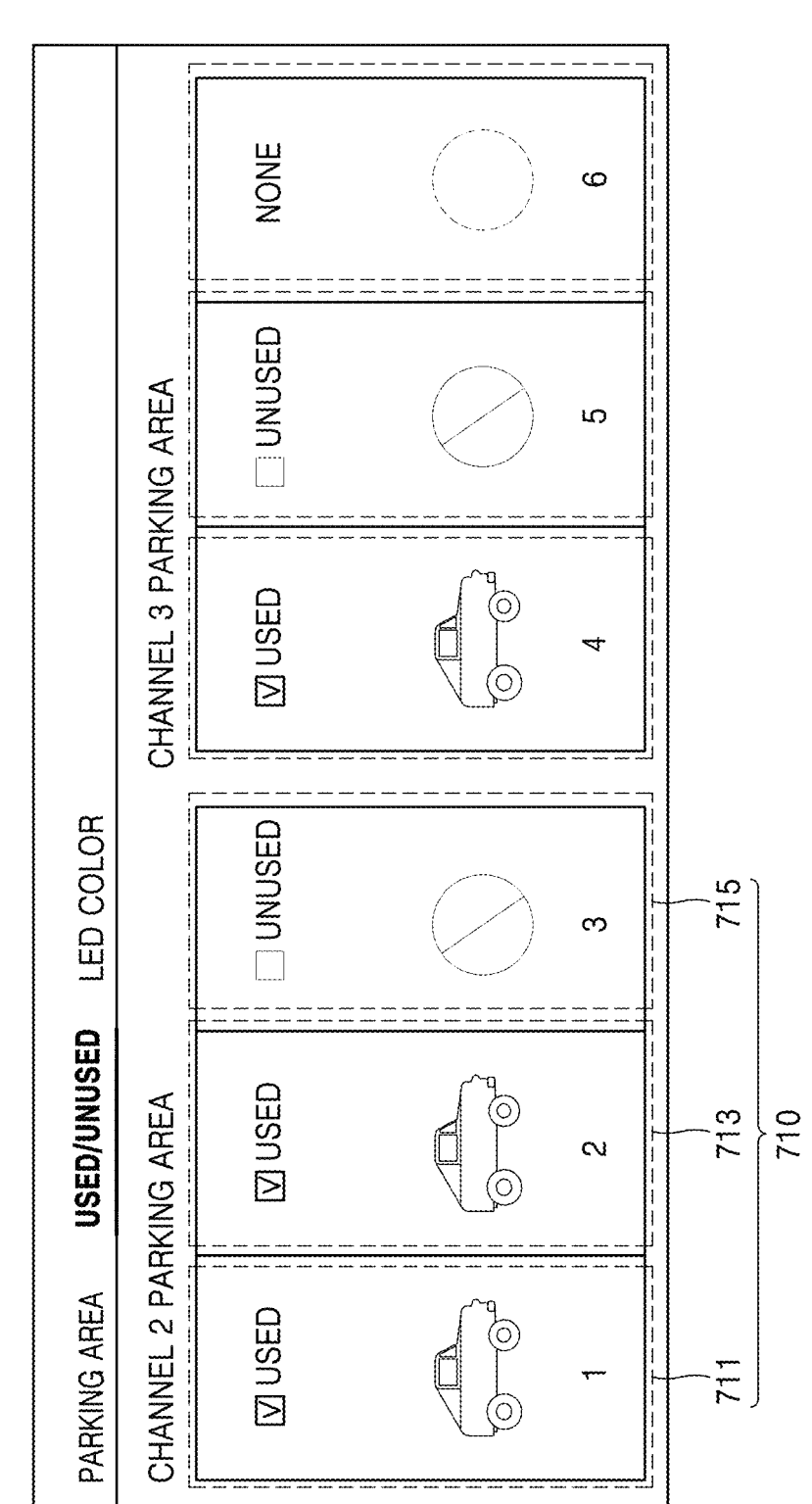
FIG. 7 is an example of a user interface for managing a parking surface, according to an embodiment.

FIG. 7 is an example of a user interface for managing a parking surface, according to an embodiment.

Referring to FIG. 7, the user may manage the one or more parking surface 341 defined by the third user interface 340. A fourth user interface 710 may obtain user inputs for managing the parking surface 341 on a screen 700. This parking surface may be defined by the third user interface 340. The fourth user interface 710 may obtain user inputs to determine a use of each respective parking surface. For example, as shown in FIG. 7, the fourth user interface 710 may obtain user inputs to determine whether a vehicle is using a first parking surface 711, a second parking surface 713, and a third parking surface 715.

Figure 8:
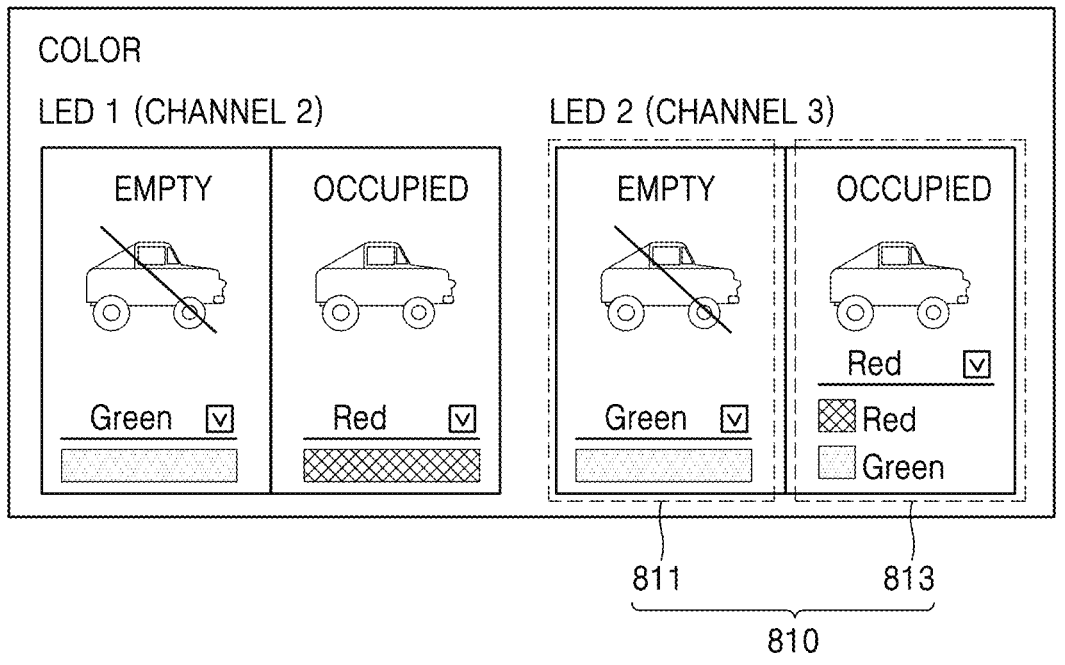
FIG. 8 is an example of a user interface for managing a parking surface, according to another embodiment.

FIG. 8 is an example of a user interface for managing one or more parking surfaces, according to an embodiment.

Referring to FIG. 8, the user may manage the defined parking surface. A fifth user interface 810 may obtain user inputs for managing the parking surface on a screen 800. This parking surface may be set by the third user interface 340. The fifth user interface 810 may obtain user inputs for controlling a lighting for each parking surface. For example, as shown in FIG. 8, the fifth user interface 810 may obtain user inputs for controlling a lighting for each of a first parking surface 811 and a second parking surface 813.

Figure 9:
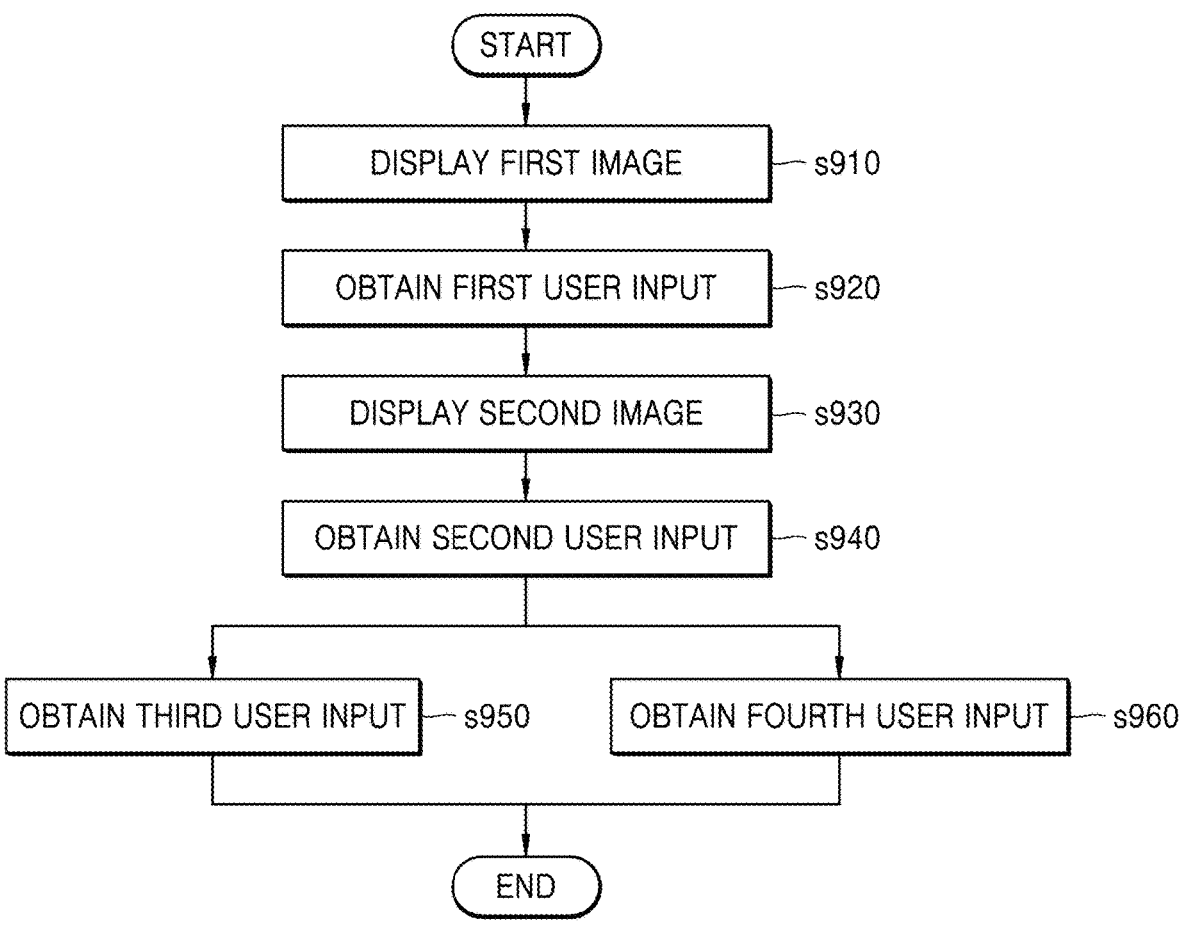
FIG. 9 is a diagram illustrating operations of a user terminal, according to an embodiment.

FIG. 9 is a diagram illustrating operations of a user terminal, according to an embodiment.

When the server 105 provides the above-described user interface to the user terminal 101, the user terminal 101 may obtain user inputs by using the user interface and may display content on the screen.

Referring to FIG. 9, in operation S910, the user terminal 101 may display the first image obtained by dewarping the captured image, using a first user interface.

In operation S920, the user terminal 101 according to an embodiment may obtain a first user input by using the user interface. The user terminal 101 may determine rotational information by obtaining the first user input using a second user interface for determining the rotational information.

For example, the second user interface may have the first control point, the second control point, and the segment connecting the first control point to the second control point and may obtain the first user input from at least one user interface element of the first control point, the second control point, and the segment.

In operation S930, the user terminal 101 according to an embodiment may display the second image obtained by dewarping the captured image based on the rotational information and the center position of the first image, using the first user interface. The rotational information may be determined by the first control point, the second control point, and the segment.

In operation S940, the user terminal 101 according to an embodiment may obtain the user input for defining one or more parking surface from the second image displayed on the screen, using a third user interface.

In operation S950, the user terminal 101 according to an embodiment may determine a use of one or more parking surfaces, using a fourth user interface.

In operation S960, the user terminal 101 according to an embodiment may control a lighting of one or more parking surface, using a fifth user interface.

The foregoing description of some embodiments provides explanations and examples of the disclosure but is not intended to be exhaustive or to limit the disclosure to the exact form disclosed. Various modifications and variations may be made from the above teachings or may be acquired from practice of the disclosure. For example, although a series of acts are described with respect to FIG. 9, the order of these acts may be changed in other embodiments consistent with the principles of the disclosure. Additionally, non-dependent operations may be executed in parallel.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. An operating method for a server, the operating method comprising:

displaying, on a screen of a user terminal, a first user interface comprising a first image obtained by correcting a captured image;

displaying, on the screen of the user terminal, a second user interface comprising a first control point, a second control point, and a segment connecting the first control point to the second control point;

obtaining a first user input from the first control point or the second control point; and in response to the first user input, displaying, through the first user interface, a second image obtained by correcting the captured image based on rotational information determined by the first control point, the second control point and the segment, and a center position of the first image, wherein the obtaining the first user input comprises moving one of the first control point or the second control point in a clockwise or counterclockwise direction about a center point between the first control point and the second control point, wherein the other of the first control point or the second control point moves in the clockwise or counterclockwise direction about the center point between the first control point and the second control point, and wherein the first user input determines a zoom of the second image based on a distance between the first control point and the second control point.

2. The operating method of claim 1, wherein the obtaining the first user input further comprises selecting the first control point or the second control point and dragging the selected first control point or the second control point to a position on the screen of the user terminal.

3. The operating method of claim 1, wherein the rotational information determines a roll, a pitch, and a yaw of the second image based on an angle formed by the first control point, the second control point, and the segment.

4. The operating method of claim 1, further comprising obtaining, through a third user interface provided to the user terminal, a second user input corresponding to a parking surface setting in the second image displayed on the screen.

5. The operating method of claim 4, further comprising obtaining, through a fourth user interface provided to the user terminal, a third user input based on a use of the parking surface based on the parking surface setting.

6. The operating method of claim 4, further comprising obtaining, through a fifth user interface provided to the user terminal, a fourth user input for controlling a lighting of the parking surface based on the parking surface setting.

7. The operating method of claim 4, wherein the obtaining the second user input comprises obtaining, through the third user interface, one or more polygon shapes respectively defining one or more parking surfaces.

8. The operating method of claim 1, wherein the obtaining the first user input further comprises selecting the first control point or the second control point and dragging the selected first control point or the second control point to a position on the screen of the user terminal, wherein the first user input determines the rotational information, and wherein the rotational information determines a roll, a pitch, and a yaw of the first image based on an angle formed by the first control point, the second control point, and the segment.

9. The operating method of claim 1, wherein the captured image comprises a plurality of images or a video.

10. A server comprising:

a memory comprising instructions for a user terminal; and a processor configured to execute the instructions to perform operations comprising:

displaying, on a screen of the user terminal, a first user interface comprising a first image obtained by correcting a captured image;

displaying, on the screen of the user terminal, a second user interface comprising a first control point, a second control point and a segment connecting the first control point to the second control point;

obtaining a first user input from the first control point or the second control point; and in response to the first user input, displaying, through the first user interface, a second image obtained by correcting the captured image based on rotational information determined by the first control point, the second control point and the segment, and a center position of the first image, wherein the obtaining the first user input comprises moving one of the first control point or the second control point in a clockwise or counterclockwise direction about a center point between the first control point and the second control point, wherein the other of the first control point or the second control point moves in the clockwise or counterclockwise direction about the center point between the first control point and the second control point, and wherein the first user input determines a zoom of the second image based on a distance between the first control point and the second control point.

11. The server of claim 10, wherein the rotational information determines a roll, a pitch, and a yaw of the second image based on an angle formed by the first control point, the second control point, and the segment.

12. The server of claim 10, wherein the processor is further configured to execute the instructions to perform an operation of obtaining, through a third user interface provided to the user terminal, a second user input corresponding to a parking surface setting in the second image displayed on the screen.

13. The server of claim 12, wherein the processor is further configured to execute the instructions to perform an operation of obtaining, through a fourth user interface provided to the user terminal, a third user input based on a use of the parking surface based on the parking surface setting.

14. The server of claim 12, wherein the processor is further configured to execute the instructions to perform an operation of obtaining, through a fifth user interface provided to the user terminal, a fourth user input for controlling a lighting of the parking surface based on the parking surface setting.

15. The server of claim 12, wherein the third user interface overlays the first user interface, wherein the second user input comprises an input of one or more polygon shapes respectively defining one or more parking surfaces.

16. The server of claim 10, wherein the processor is further configured to execute the instructions to perform an operation of displaying, through a sixth user interface provided to the user terminal, the captured image in an uncorrected state.

17. A computer-readable recording medium on which a computer program is recorded, wherein the computer-readable recording medium comprises instructions to cause a processor to:

display, on a screen of a user terminal, a first user interface comprising a first image obtained by correcting a captured image;

display, on the screen of the user terminal, a second user interface comprising a first control point, a second control point, and a segment connecting the first control point to the second control point;

obtain a first user input from the first control point or the second control point; and in response to the first user input, display, through the first user interface, a second image obtained by correcting the captured image based on rotational information determined by the first control point, the second control point and the segment, and a center position of the first image, wherein the obtaining the first user input comprises moving one of the first control point or the second control point in a clockwise or counterclockwise direction about a center point between the first control point and the second control point, wherein the other of the first control point or the second control point moves in the clockwise or counterclockwise direction about the center point between the first control point and the second control point, and wherein the first user input determines a zoom of the second image based on a distance between the first control point and the second control point.

* * * * *